United States Patent [19]

Horino et al.

[11] Patent Number: 5,895,686
[45] Date of Patent: Apr. 20, 1999

[54] PROCESS FOR PRODUCING PLANT GLYCOGEN

[75] Inventors: Toshiroh Horino; Takayo Saikusa; Akihiko Onoda, all of Fukuyama, Japan

[73] Assignee: Director General of Chugoku National Agricultural Experiment Station, Ministry of Agriculture, Forestry and Fisheries, Fukuyama, Japan

[21] Appl. No.: 08/922,184

[22] Filed: Sep. 2, 1997

[30] Foreign Application Priority Data

Feb. 24, 1997 [JP] Japan ..................... 9-054236

[51] Int. Cl.[6] ............... A23L 1/0522; A23L 1/09
[52] U.S. Cl. .............. 426/658; 426/459; 426/460; 426/463; 426/469; 426/578; 426/661
[58] Field of Search ................. 426/658, 578, 426/661, 459, 460, 463, 469

[56] References Cited

U.S. PATENT DOCUMENTS

| | | | |
|---|---|---|---|
| 5,183,677 | 2/1993 | Lehtomaki et al. | 426/436 |
| 5,356,655 | 10/1994 | White et al. | 426/578 |
| 5,695,803 | 12/1997 | Sharp et al. | 426/578 |

FOREIGN PATENT DOCUMENTS 058 133  8/1982  European Pat. Off. .

OTHER PUBLICATIONS

Jose A. Cura and Clara R. Krisman, "Cereal Grains: A Study of Their α-1, 4-α-1,6 Glucopolysaccharide Composition", (1990), 171-175, *Stärke*, vol. 42, No. 5.

Koji Kato et al., "Chemical Features of Water Soluble Polysaccharides in Some Seeds", (1989), *Chemical Abstracts*, vol. 110, No. 17, Abstract No. 151361.

*Primary Examiner*—Helen Pratt
*Attorney, Agent, or Firm*—Frishauf, Holtz, Goodman, Langer & Chick, P.C.

[57] ABSTRACT

Plant glycogen is a polysaccharide derived from rice and contains a high molecular weight group whose weight average molecular weight is 5.00 to 7.60 million and a low molecular weight group whose weight average molecular weight is 0.30 to 1.10 million, the glycogen is a glucose polymer, being easily dissolved in cold water and hot water, and being rendered viscous at the time of degree of water addition of 25 to 200%. The process for producing plant glycogen, includes immersing finely ground rice in water or a water-containing solvent, subjecting it to solid-liquid separation to give an extract, heating it to remove thermally precipitated solids and proteins, adding the resulting liquid layer to an organic solvent, and recovering the resulting white precipitates, followed by purification, if necessary.

10 Claims, 4 Drawing Sheets

5,895,686

1

PROCESS FOR PRODUCING PLANT GLYCOGEN

FIELD OF THE INVENTION

The present invention relates to a plant glycogen (or phytoglycogen) and a process for producing the same and in particular to a plant glycogen being a viscous polymer occurring in rice and easily dissolved in cold and hot water and a process for producing the same.

BACKGROUND OF THE INVENTION

Conventionally, a large number of studies have been made of saccharides from cereals. Particularly with respect to starch, there are an overwhelming number of reports relating to its major components i.e., amylose and amylopectin after the epoch-making results of the study on starch made by K. H. Meyer in 1940. According to Jiro Nikuni ("Denpun Kagaku Handbook" (Starch Science Handbook), compiled by Jiro Nikuni and published in 1977 by Asakura Shoten K. K., Japan), starch manufacturing industry developed thereafter is also an industry which has been developed basically following their results.

Meanwhile, it has been revealed that a substance called glycogen, which is similar to starch amylopectin, is present in an animal body and serves as an important energy source, as described in a method for experiment on starch-related saccharides ("Seikagaku Jikkenho" (Experimental Method in Biochemistry), vol. 19, page 22, published in 1986 by Gakkai Shuppan Center, Japan). However, as is also reported by Nakamura Y. et al. (PHYSIOLOGIA PLANTARUM, 97, 491–498 (1996), Denmark), the presence of a plant glycogen-like substance is suggested by using special experimental products such as corn (unmatured seeds), corn starch mutant species (e.g. sugary species and amylose extender species), and rice starch mutant species (the same mutant species as above). However, the presence of such a substance for rice serving as a usual common food is not known so far, and as a matter of fact, the industrial application of such a substance has not been made.

SUMMARY OF THE INVENTION

The object of the present invention is to provide a plant glycogen derived from rice and a process for producing the same.

As a result of their eager study on glycogen derived from rice, the present inventors found that one saccharide fraction from rice produced worldwide and consumed in a large amount is highly branched polysaccharides which are dissolved very well in cold water and highly viscous with a suitable water content, that is, a plant glycogen. The present invention was completed on the basis of such finding.

In a first embodiment, the present invention relates to a plant glycogen which is a polysaccharide being derived from rice and containing a high molecular weight group whose weight average molecular weight is 5.00 to 7.60 millions and a low molecular weight group whose weight average molecular weight is 0.30 to 1.10 million, said glycogen consisting essentially of a glucose polymer, being easily dissolved in cold water and hot water, and being rendered viscous at the time of a degree of water addition of 25 to 200%.

In a second embodiment, the present invention concerns a process for producing the plant glycogen as described in the first embodiment, which comprises immersing finely

2 ground rice in water or a water-containing solvent, subjecting it to solid-liquid separation to give an extract, heating it to remove thermally precipitated solids and proteins, adding the resulting liquid layer to an organic solvent, and recovering the resulting white precipitates, followed by being purified as necessary.

In the first embodiment, the present invention preferably provides a food or food material containing said plant glycogen.

Also, in the first embodiment, the present invention preferably provides a viscous material containing said plant glycogen.

DETAILED DESCRIPTION OF THE PREFERRED EMBODIMENTS

Figure 1:
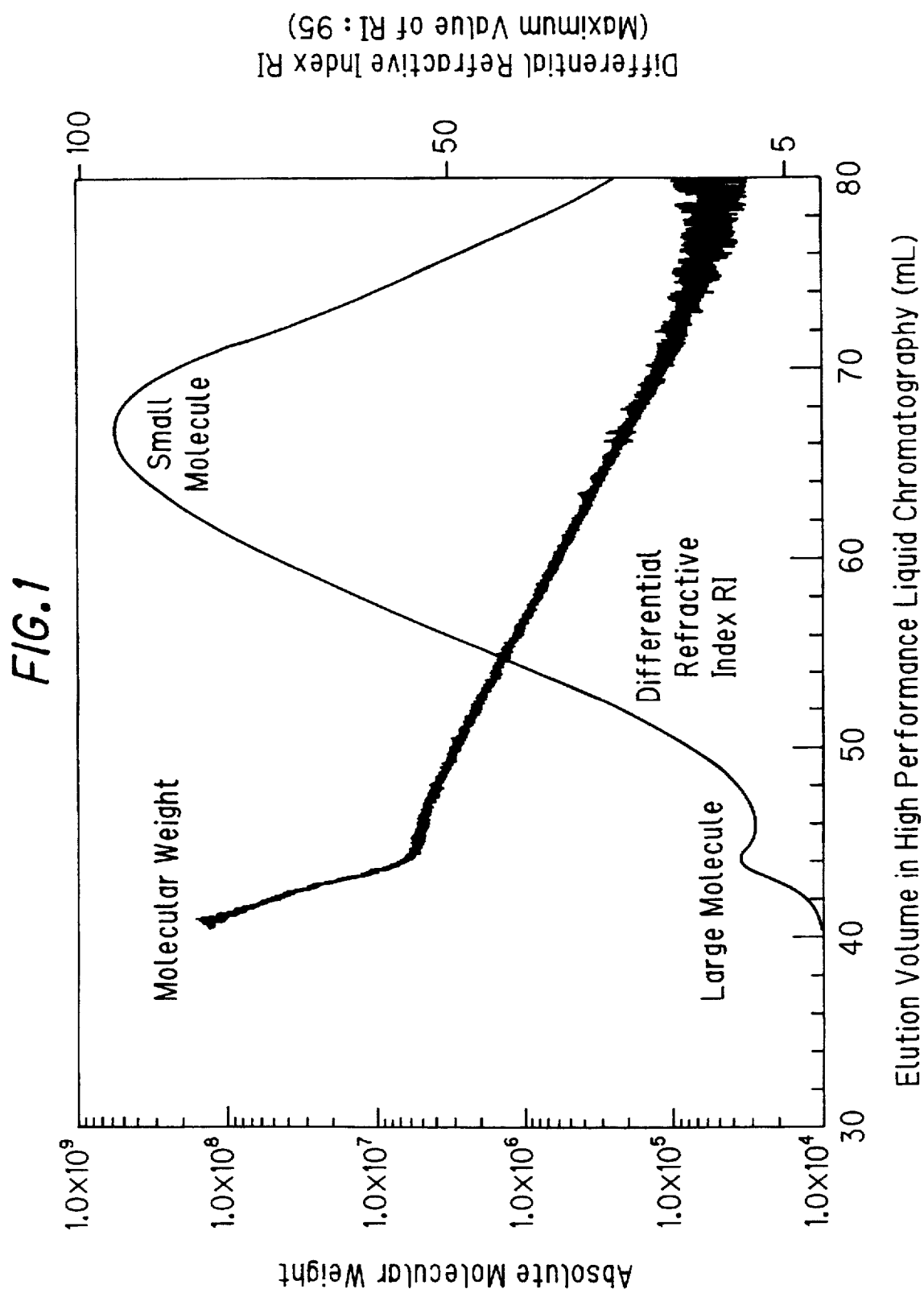
FIG. 1 is a graph which shows the fractionation and molecular weight distribution of rice glycogen derived from a high amylose species (Hoshiyutaka).

There is no limitation on the variety etc. of rice used in the present invention. However, rice has slightly different contents, properties and a molecular weight distribution depending on variety groups such as Japonica species and Indica species or on types of use such as Uruchi species (used as boiled rice), Mochi species (used for production of rice cake), species for production of sake etc., so the Mochi species is preferable for production of high molecular weight glycogen and the Indica type high amylose species is preferable for production of low molecular weight glycogen.

The content of rice glycogen is different depending on the variety group, type of use etc. of the starting rice. Usually, its content is about 9% (by weight) in a high amylose species, about 13% (by weight) in a intermediate amylose species as Uruchi species, and about 32% (by weight) in an amylose-free species as Mochi species. Rice glycogen is hardly contained in a rice bran layer. Further, there is a content gradient in a grain of rice and its content is increased gradually from the surface layer to the inside layer of polished rice. To use a plant glycogen in foods, it is preferred to avoid using a starting material with bitter or astringent tastes.

Hereinafter, a plant glycogen from rice as the starting material and a process for producing the same are described.

Although unpolished rice can also be used as the starting material, a rice bran layer consisting of pericarp, seed coat, aleurone layer etc. present in the outermost layer on a grain of unpolished rice hardly contains rice glycogen as described above, and thus the bran layer is desirably removed before use so that the purification of glycogen as described below will be assured and facilitated, and in particular polished rice with a rate of polishing of 91% or thereabout is preferably used. However, because the content of rice glycogen increases towards the center of a grain of rice, polished rice with a rate of polishing of 91% or less or rice powder from a part of polished rice can also be used as the starting material.

In the case where rice with a rate of polishing of 91% or thereabout is to be used as the starting material, the procedure is as follows: First, rice is pulverized (finely ground). This treatment can be effected using a grinding rice-abrasive-milling machine equipped with an emery roll or an apparatus with equivalent functions. Because rice glycogen is present inside of an amyloplast envelope as an intracellular structure so-called "compound starch granules" i.e., usually having a plurality of starch granules enclosed with an intracellular membrane, this compound starch granules structure should be disrupted preferably to at least the starch granules structure in said structure.

The finely ground rice powder is immersed in water or a water-containing solvent. In the immersion, a water-soluble substance is extracted preferably by stirring. The solvent used is preferably of an aqueous type and includes a mixture of water and an organic solvent such as methanol or ethanol where usually 5- to 15-fold excess water is used for immersion and extraction.

The extraction operation is carried out at a temperature of 37° C. or less, usually 1 to 30° C., preferably 1 to 20° C. for 1 minute to 1 hour, preferably 3 to 30 minutes with stirring. Extraction at a temperature of 40° C. or more is not preferable because gelatination of amylose or amylopectin by the coexistent enzyme is initiated while the efficiency of extraction is decreased. If a stirring treatment is conducted, a conventional apparatus such as an ultrasonic shaker etc. is preferably used to effect the treatment in a short time.

After the immersion treatment is finished, the supernatant is recovered by a suitable solid-liquid separation means such as precipitation by gravity, centrifugation or filtration. If solid-liquid separation is carried out by centrifugation, amylose and amylopectin fragments will remain in the supernatant at a low rotation speed, while a part of the desired substance is precipitated at a high rotation speed. Therefore, the centrifugation should be carried out preferably at 7000 to 10000 r.p.m., more preferably 8500 r.p.m. for 5 to 20 minutes, preferably about 10 minutes.

Depending on the characteristics of the starting material, the resulting supernatant usually contains crude glycogen at a content of 80 to 95% as a percentage by weight after drying, and further contains proteins, lipids, free saccharides, minerals, and tasting components originating in the starting material. As one of the major characteristics, the supernatant becomes viscous like gum upon addition of a small amount water, and if water is further added, it easily forms an aqueous solution via a solution similar to starch syrup. Therefore, it can be utilized in the form of a liquid or may be dried as necessary for use as a crude product containing glycogen. Further, additives such as sweeteners, flavors, pigments, fillers etc. can be suitably blended with it in consideration of its intended use etc. Usually, it is further purified as necessary to give glycogen with a higher degree of purification as white powder or solid.

One embodiment of the present invention in purifying plant glycogen is as follows: The above supernatant is heated at 80 to 100° C. for 5 to 100 minutes, preferably at 90° C. for 15 minutes or thereabout, and the thermally precipitated solids are removed by a suitable solid-liquid separation means. Usually, the thermally precipitated solids are removed by centrifugation at e.g. 3000 to 5000 r.p.m. for 5 to 20 minutes, preferably 4000 r.p.m. for 5 minutes.

Then, the remaining proteinous substances such as proteins etc. are removed from the liquid layer. In this operation, trichloroacetic acid is poured at a final concentration of 5% into the liquid layer, then stirred and left, and the solids thus formed are then removed by a suitable solid-liquid separation means. Usually, such proteinous substances are removed using the same means as for removing the thermally precipitated solids described above.

Depending on the intended use of the purified product, it is also possible to use vinegar being adjusted to a final concentration to about 1% or a bitter soup of which the amount to be added is about 0.5% in place of trichloroacetic acid in the step of removing the proteins.

If the clear solution thus obtained is poured into a methanol solution prepared at a final concentration of 20% or more, preferably 75% or more, white precipitates will occur. After the clear solution was poured into the methanol solution, it is left for 5 minutes to 10 hours, preferably 60 minutes, the white precipitates are recovered using a suitable solid-liquid separation means. In this case, too, the above-described means of removing proteins is usually applied. Thereafter, the precipitates are dried using a suitable means to give plant glycogen as white powder or solid. This product is free of any taste originating in the starting material.

Ethanol can be used in place of methanol in the step of adding the supernatant after removal of protein to an organic solvent to form white precipitates. The product obtained in this manner has a higher degree of purification.

The purified product obtained by using the treatment described above can be subjected to an additional purification step using a suitable organic solvent so that its degree of purification can further be raised. Further, volatile impurities can be removed by vacuum lyophilization. These products are usually disrupted and ground for use as powder.

Although the plant glycogen of the present invention can be produced by the process described above, the purification step can also be omitted, altered or added depending on the intended use etc. of the product. For example, the plant glycogen of the present invention is intended to be used as a food or food material, water is added to rice powder and extracted with stirring and the resulting extract is subjected to solid-liquid separation, and the supernatant is dried directly or after concentrated by a suitable mean to give a crude product containing rice glycogen. If a domestically produced Japonica species of good qualities is used as the starting material, it has not only viscosity but also sweetness of good qualities in the presence of a suitable amount of water, so a suitable amount of water is added to the product as necessary.

When the properties of the plant glycogen of the present invention were examined, the plant glycogen was characterized by its viscosity varied significantly depending on the amount of water added; that is, it becomes a gum-like substance upon addition of a small amount of water (about 25 to 40%), becomes a starch syrup-like substance upon addition of a moderate amount of water (about 40 to 200%), and becomes a viscous liquid upon addition of a large amount of water (about 200 to 400%). By this character, cooked rice can be rendered viscous in the presence of a predetermined amount of water.

Therefore, when cooked, rice with a high content of rice glycogen is of high viscosity, while rice with a low content of rice glycogen is of less viscosity. The viscosity of cooked rice can be estimated from this relationship by measuring the content of rice glycogen in the starting rice with a suitable scientific means.

The plant glycogen of the present invention, similar to animal glycogen, consists of 2 groups i.e., a high molecular weight group and a low molecular weight group. Namely, it is polysaccharides containing a high molecular weight group with a weight average molecular weight of 5.00 to 7.60 million and a low molecular weight group with a weight average molecular weight of 0.30 to 1.10 million, both of which consist essentially of glucose polymers. This glycogen is highly branched and easily dissolved in both cold and hot water, and is rendered viscous at the time of a degree of water addition of 30 to 200%.

The effect of the present invention is as follows: According to the present invention there is provided a plant glycogen easily dissolved in both cold and hot water and rendered viscous in a range of suitable water contents. By virtue of such characteristics of the plant glycogen, it can be used as food material by adding it to e.g. drinks and foods, milk substitutes and other various foods. Further, it can also be used as a biomechanism controlling product, medical drug, quasi-drug, fillers (diluents) etc. Furthermore, the plant glycogen of the present invention can be used as a viscous material in e.g. pastes, adhesives, consolidation agents etc.

EXAMPLES

Hereinafter, the present invention is described in detail with reference to the Examples.

EXAMPLE 1

Four kinds of domestically produced rice i.e. high amylose rice (Hoshiyutaka), intermediate amylose rice (Koshihikari), low amylose rice (Ohuu No. 344) and amylose-free rice (Himenomochi) were used as starting materials, from which polished rice with a rate of polishing of 91% was prepared, and 91 to 71% of the surface layer was collected by abrasive-milling it in a rice abrasive-milling machine equipped with an emery roll (Rice Abrasive-milling Tester manufactured by Chiyoda Engineering, Japan).

100 g of the abrasive-milled fine powder was subjected to immersion treatment at 20° C. for 5 minutes after 5-fold excess water was added to it. Meanwhile, it was shaken in an ultrasonic shaker (NISSEI NS-600). After the shaking operation was finished, it was centrifuged (8500 r.p.m., 10 minutes) to give 350 ml supernatant containing crude glycogen. The supernatant was heated (90° C., 15 minutes), then left to be cooled and centrifuged (4000 r.p.m., 5 minutes) to remove the thermally precipitated solids.

To remove the proteins present therein, trichloroacetic acid was added dropwise to the supernatant at a final concentration of 5% and the solution was centrifuged again (under the same conditions as before) whereby the insolubles were removed to give about 330 ml of transparent supernatant. This supernatant was added to 3-fold excess amount of methanol and the formed white precipitates were collected by centrifugation (under the same conditions as before), then washed with diethyl ether and air-dried to give rice glycogen as powder or solid.

The yield of rice glycogen (% by weight relative to the starting rice powder) is shown in Table 1. As is evident from the table, the yield of rice glycogen was varied depending on the type of the starting rice and ranged from 9.5 to 32.2% based on the weight of the starting rice powder.

TABLE 1

| Type of Starting Rice (Variety) | Yield of Rice Glycogen (Weight-% Based on Starting Rice Powder) |
|---|---|
| high amylose species (Hoshiyutaka) | 9.5 |
| intermediate amylose species (Koshihikari) | 13.0 |

TABLE 1-continued

| Type of Starting Rice (Variety) | Yield of Rice Glycogen (Weight-% Based on Starting Rice Powder) |
|---|---|
| low amylose species (Ohuu No. 344) | 15.8 |
| amylose-free species (Himenomochi) | 32.2 |

Then, an intermediate amylose species (Hinohikari) was tested for examination of the content of rice glycogen in each layer of its rice grain. The results are shown in Table 2. As shown in the table, the rice glycogen is characterized in that it is hardly contained in the rice bran layer but contained in a large amount in the abraded rice portion. There is a gradient of glycogen content in the abraded rice, and rice glycogen is contained in an amount of about 17% in the surface layer of abraded rice, while it is contained in an amount of about 25% in the inner layer of abraded rice with a rate of abrasive-milling of 71 to 66% and its content increases gradually towards the center of the grain.

TABLE 2

| Classification of Starting Powder Based on Layer | Content of Rice Glycogen (Weight-% Based on Starting Rice Powder) |
|---|---|
| powder of the rice bran layer with a rate of abrasion of 100 to 91% | 1.9 |
| powder of the surface layer of abraded rice with a rate of abrasion of 91 to 86% | 17.1 |
| powder of the surface layer of abraded rice with a rate of abrasion of 86 to 81% | 23.1 |
| powder of the intermediate layer of abraded rice with a rate of abrasion of 81 to 76% | 23.4 |
| powder of the intermediate layer of abraded rice with a rate of abrasion of 76 to 71% | 23.8 |
| powder of the inner layer of abraded rice with a rate of abrasion of 71 to 66% | 25.0 |

Further, chemical characteristics of these glycogens were examined and compared in the following manner.

First, when it was colored in a usual manner with an iodine-potassium iodide solution, its color was pale blue to pale pink violet color different from the vivid blue color indicated by normal amylose, and its maximum absorption wavelength ($\lambda$max) was present at a wavelength about 30 nm shorter than that of amylose. Further, the absorbance at 600 nm determined in a usual manner was only about $\frac{1}{7}$ to $\frac{1}{25}$ relative to the absorbance of amylose, and its affinity for iodine was evidently low. In addition, the characteristics of its molecule were confirmed with a laser scattering type absolute molecular weight measuring device (Wyatt DAWN type (manufactured by Wyatt Technology Co.,CA), equipped with Shodex-GPC (manufactured by Shokotusho K. K., Japan) using pullulan as a molecular-weight standard). The results are shown in Table 3.

TABLE 3

| Type of Starting Rice (Variety) | Color | Absorption Maximum | M.W. of High Molecule | M.W. of Low Molecule |
|---|---|---|---|---|
| high amylose species (Hoshiyutaka) | pale blue | 590 nm | $5.90 \times 10^6$ | $0.31 \times 10^6$ |
| intermediate amylose species (Koshihikari) | pale pink violet | 575 nm | $7.10 \times 10^6$ | $0.49 \times 10^6$ |

TABLE 3-continued

| Type of Starting Rice (Variety) | Color | Absorption Maximum | M.W. of High Molecule | M.W. of Low Molecule |
|---|---|---|---|---|
| low amylose species (Ohuu 344) | violet blue | 580 nm | $6.08 \times 10^6$ | $0.69 \times 10^6$ |
| amylose-free species (Himenomochi) | pale pink violet | 540 nm | $7.53 \times 10^6$ | $1.07 \times 10^6$ |
| reagent amylose (derived from potato) | vivid blue | 610 nm | (N.M.) | (N.M.) |

N.M.: not measurable.
Note: Molecular weight (M.W.) shown above is the average (weight average molecular weight) of the whole fraction of the corresponding molecule.

Figure 2:
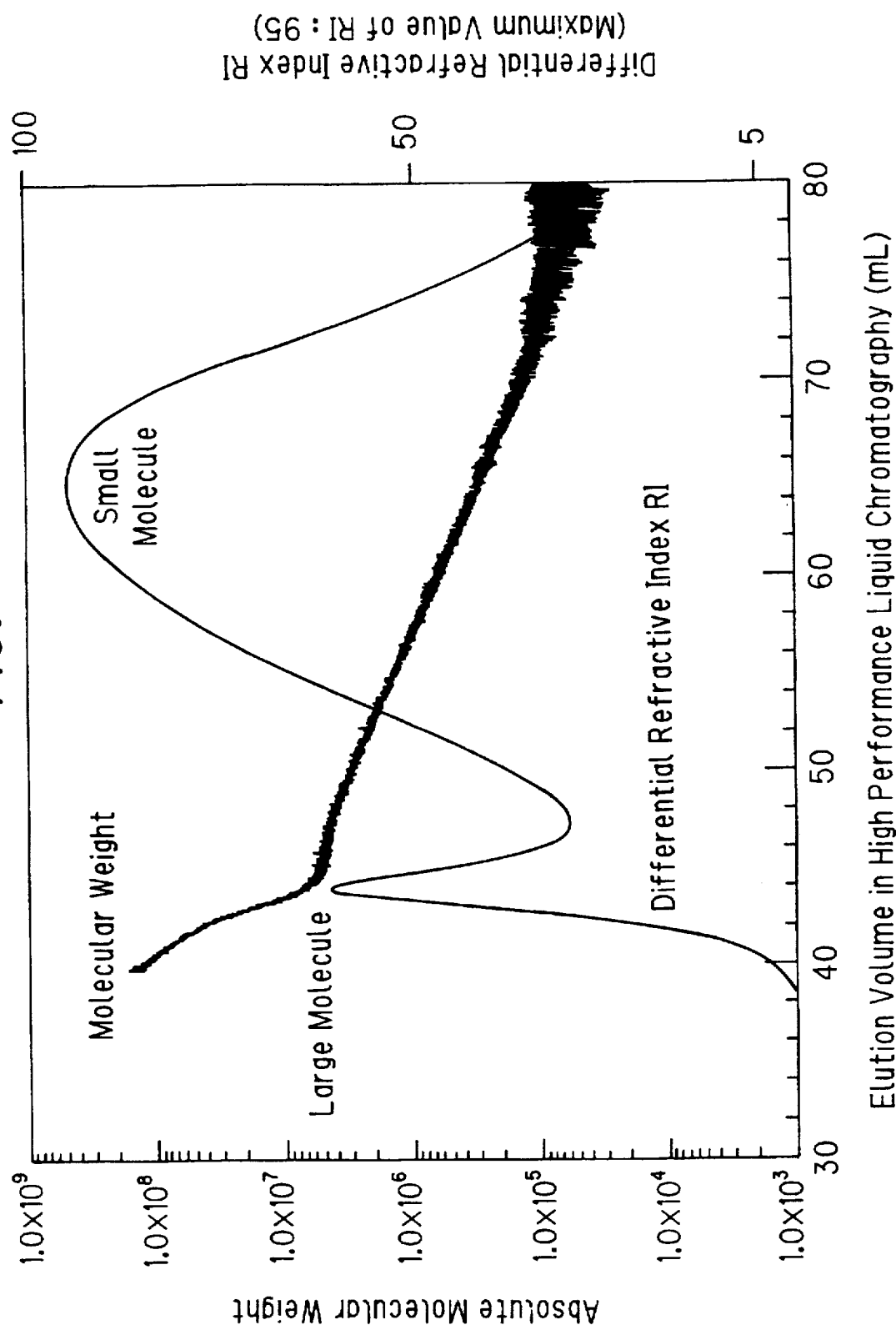
FIG. 2 is a graph which shows the fractionation and molecular weight distribution of rice glycogen derived from a intermediate amylose species (Koshihikari).
Figure 3:
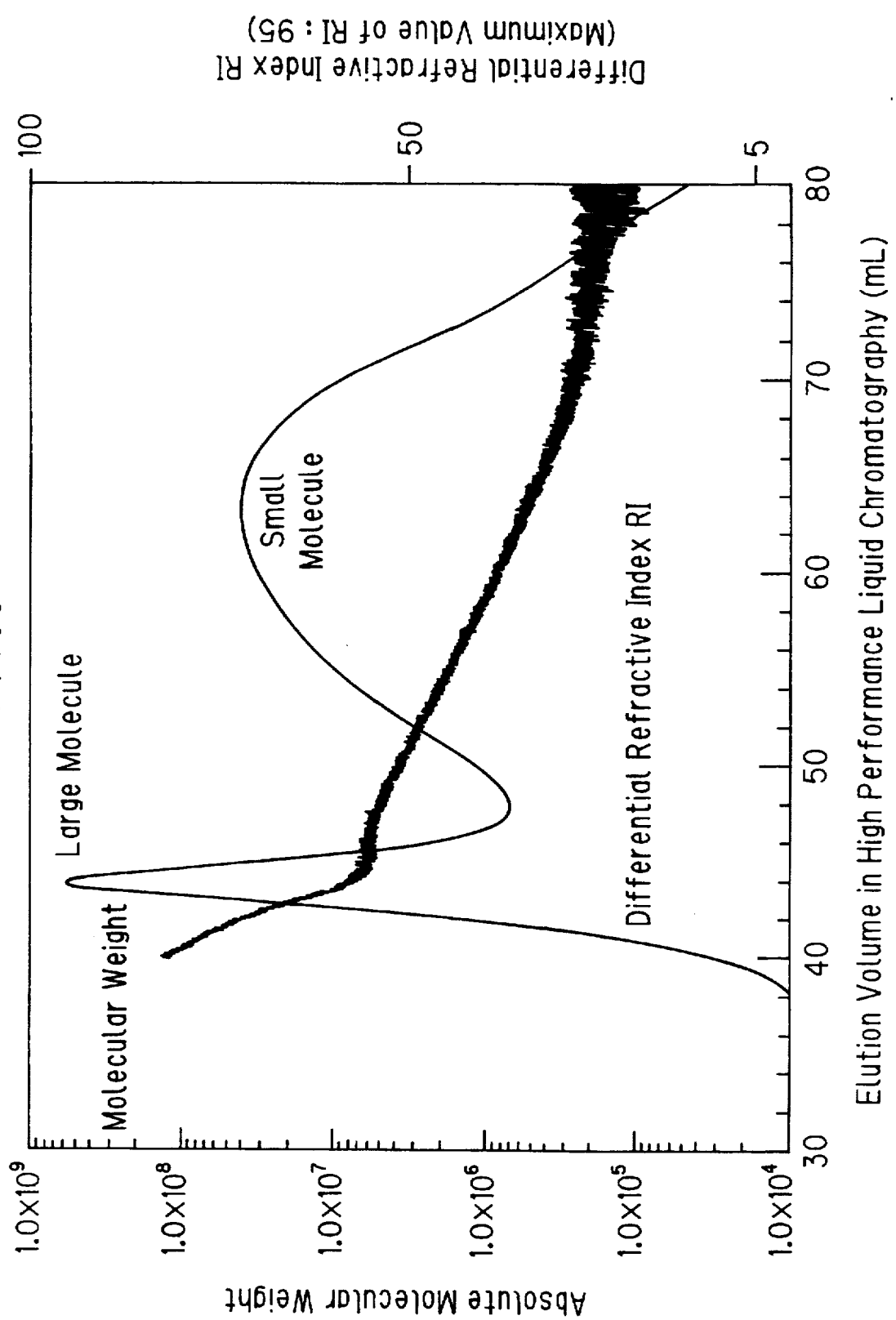
FIG. 3 is a graph which shows the fractionation and molecular weight distribution of rice glycogen derived from a low amylose species (Ohuu No. 344).
Figure 4:
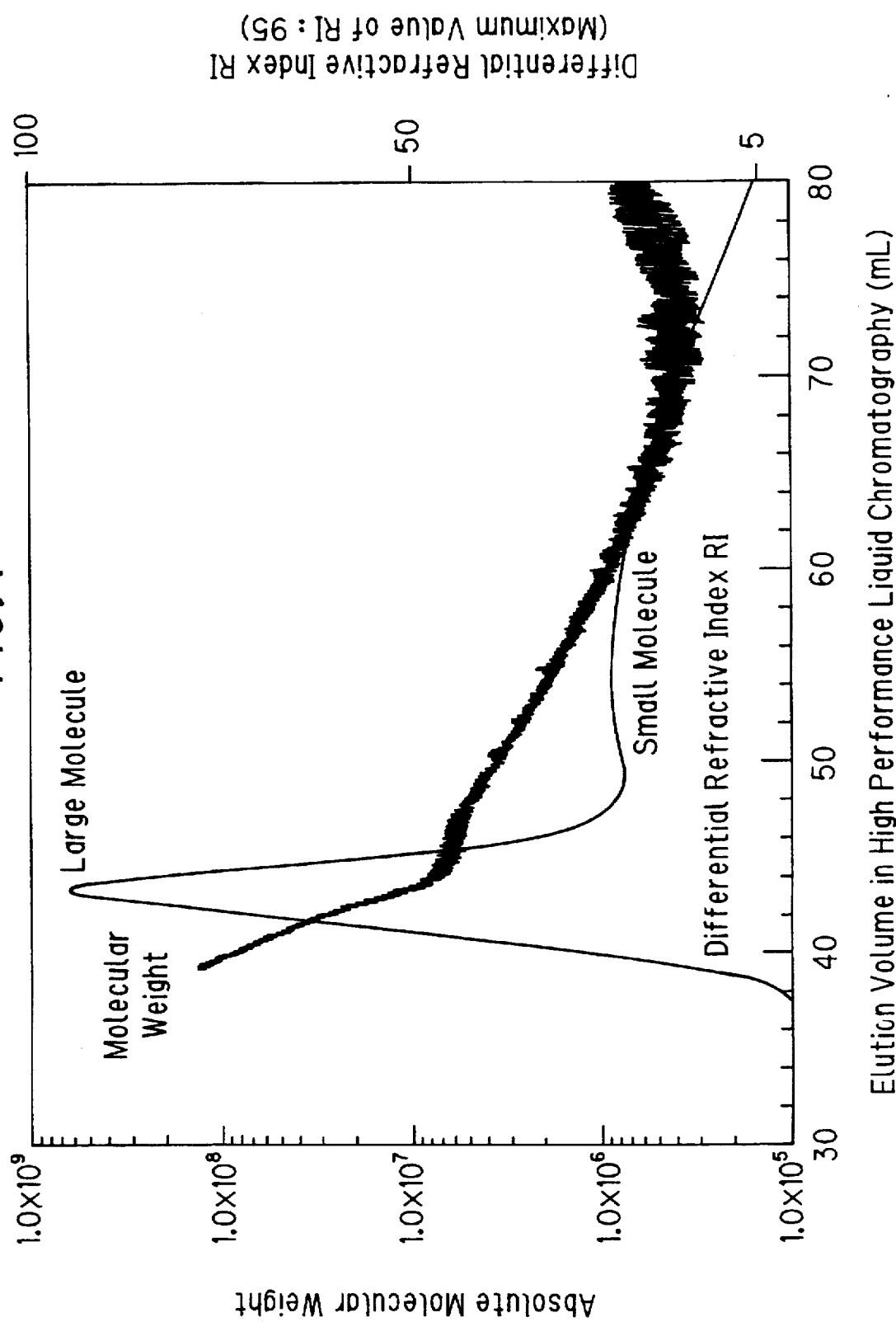
FIG. 4 is a graph which shows the fractionation and molecular weight distribution of rice glycogen derived from an amylose-free species (Himenomochi).

The rice glycogen contents determined by the laser scattering type absolute molecular weight measuring device are shown in FIG. 1 for the high amylose species (Hoshiyutaka), FIG. 2 for the intermediate amylose species (Koshihikari), FIG. 3 for the low amylose species (Ohuu No. 344), and FIG. 4 for the amylose-free species (Himenomochi), respectively.

The rice glycogen was composed of a high molecular weight group with a molecular weight having a distribution center of about 5.00 to 7.60 million and a low molecular weight group with a molecular weight having a distribution center of about 0.30 to 1.10 million, though varied slightly depending on the starting material. The high molecular weight group was contained in a larger amount in the Mochi species but in a trace amount in the high amylose species.

From the foregoing aspects, the rice glycogen of the present invention could be clearly distinguished from known amylose and amylopectin or from soluble starch etc. prepared by chemical means.

EXAMPLE 2

Four species i.e., a high amylose species (Hoshiyutaka) as low viscous rice, an intermediate amylose species (Koshihikari) as moderately viscous rice, a low amylose species (Ohuu No. 344) as highly viscous rice and an amylose-free species (Himenomochi) as extremely highly viscous rice were used as the starting rice, and rice glycogen was obtained as white powder/solid mixture in the same manner as in Example 1. The yield of each rice glycogen is as shown in Table 1 in Example 1, and the yield was 9.5% for the high amylose species (Hoshiyutaka), 13.0% for the intermediate amylose species (Koshihikari), 15.8% for the low amylose species (Ohuu No. 344), and 32.2% for the amylose-free species (Himenomochi), indicating that the recovery of rice glycogen was raised as rice viscosity increased. The rice glycogen consists of 2 groups i.e. a high molecular weight group and a low molecular weight group as described in Example 1, and the high molecular weight group was contained in a larger amount in the amylose-free Mochi species, and the low molecular weight group was contained in a larger amount in the high amylose species. The rice glycogen with a different distribution of molecular weight could be produced in this manner by selecting the starting material.

EXAMPLE 3

As the starting rice, an intermediate amylose species (Hinohikari) was used to prepare rice glycogen in the same manner as in Example 1. Water was added at various amounts to the resulting rice glycogen, and the hydrated glycogen was examined for features. The results are shown in Table 4.

TABLE 4

| Degree of Water Addition to Rice Glycogen | Features of Hydrated Glycogen |
|---|---|
| 0% | white powder |
| 30% | semitransparent gum-like material |
| 50% | transparent, highly viscous starch syrup-like material |
| 75% | transparent starch syrup-like material |
| 100% | transparent and fluidal starch syrup-like material |
| 300% | transparent and viscous liquid |
| 1000% | transparent and non-viscous liquid |

As is evident from the table, the rice glycogen is characterized in that as its water content is increased, it forms a starch syrup-like material via a gum-like material.

If water is further added, the form of the rice glycogen proceeds via a viscous transparent solution to a transparent aqueous solution hardly having viscosity. Further, the rice glycogen is excellent in digestibility and thus useful as an energy source for humans. Furthermore, the rice glycogen in the form of an aqueous solution does not gelatinize even by heating and maintains high fluidity, so that if it is to be utilized as a food material, the rice glycogen may be used in a suitable amount in consideration of its intended use. For example, it can be added to a fluidal food such as soup etc. to utilize the above characteristic feature.

While the invention has been described in detail and with reference to specific embodiments thereof, it will be apparent to one skilled in the art that various changes and modifications can be made therein without departing from the spirit and scope thereof.

The entire disclosure of Japanese Patent Application No. 9-54236 filed on Feb. 24, 1997 including specification, claims and summary are incorporated herein by reference in its entirety.

What is claimed is:

1. A process for producing a plant glycogen comprising a polysaccharide isolated from polished rice and containing a high molecular weight group having a weight average molecular weight of 5.00 to 7.60 million, said plant glycogen consisting essentially of a glucose polymer, said plant glycogen being easily dissolved in cold water and in hot water, and when water is added to said plant glycogen in an amount of 25 to 200%, the resultant plant glycogen and water have flow characteristics of a gum or a syrup, the process which comprises:

(a) immersing finely ground polished rice in water or a water-containing solvent, (b) subjecting the resulting liquid from step (a) to a solid-liquid separation to provide an extract, (c) heating the resulting extract from step (b) to remove thermally precipitated solids and proteins to form a liquid layer, (d) adding the liquid layer from the step (c) to an organic solvent, and (e) recovering resulting white precipitates, optionally followed by purification.

2. The process according to claim 1, wherein the ground polished rice is a ground polished rice obtained by abrasivemilling polished rice.

3. The process according to claim 2, wherein the water-containing solvent is a mixture of water and an organic solvent selected from the group consisting of methanol and ethanol.

4. The process according to claim 3, wherein step (a) is carried out at a temperature of 1 to 30° C. for 1 minute to 1 hour.

5. The process according to claim 3, wherein step (a) is carried out at a temperature of 1 to 20° C. for 3 to 30 minutes.

6. The process according to claim 5, wherein in step (b), the solid liquid separation is carried out by centrifugation at 7000 to 10,000 r.p.m. for 5 to 20 minutes.

7. The process according to claim 6, wherein the heating in step (c) is carried out at a temperature of 80° to 100° C. for 5 to 100 minutes.

8. The process according to claim 7, wherein in step (c), the thermally precipitated solids are removed by centrifugation at 3,000 to 5,000 r.p.m. for 5 to 20 minutes.

9. The process according to claim 8, wherein in step (d), the organic solvent is selected from the group consisting of methanol and ethanol.

10. The process according to claim 9, wherein the rice is a rice of a species selected from the group consisting of Japonica, Indica, Mochi and Uruchi.

* * * * *